United States Patent [19]
Johnston

[11] 3,878,015
[45] Apr. 15, 1975

[54] METHOD OF MOLDING CURVED VENEER LAMINATED STOCK

[75] Inventor: Ervin R. Johnston, Lenoir, N.C.

[73] Assignee: Sterling-Bruce, Incorporated, Lenoir, N.C.

[22] Filed: Aug. 1, 1972

[21] Appl. No.: 277,121

[52] U.S. Cl. .......... 156/222; 144/281 E; 144/309 B; 144/309 Q; 156/245; 156/581; 161/125; 161/251; 425/383; 425/406
[51] Int. Cl. ....... B27d 1/08; B27d 3/00; B32b 21/14
[58] Field of Search ........ 144/281 R, 309 B, 309 Q, 144/281 E; 156/222, 224, 228, 245, 581; 161/125, 251; 425/383, 406

[56] References Cited
UNITED STATES PATENTS

| | | | |
|---|---|---|---|
| 2,419,532 | 4/1947 | Brown | 144/281 E |
| 2,675,338 | 4/1954 | Phillips | 156/224 |
| 3,586,689 | 6/1971 | Nickerson et al. | 260/29.6 |
| 3,597,800 | 8/1971 | Silverman | 264/292 X |
| 3,619,346 | 11/1971 | Sandler | 161/251 |
| 3,816,044 | 6/1974 | Nielsen et al. | 425/157 |

*Primary Examiner*—Douglas J. Drummond
*Assistant Examiner*—Robert A. Dawson
*Attorney, Agent, or Firm*—Roy B. Moffitt

[57] ABSTRACT

Disclosed is a method of manufacturing a laminated veneer stock that is dimensionally stable, resistant to splitting, cracking and checking. The method disclosed calls for providing at least one innermost and two outermost veneer sheets each having a grain and two major surface areas. A coating of polyvinyl acetate is applied to both major surfaces of the innermost sheet or sheets and one of the major surfaces of both of the outermost sheets. After assembling the coated veneer sheets into a pile — with the sheets having a coating-to-coating relationship between all major surfaces save for one surface each of the outermost veneer sheets and the grain of each sheet extending in a common direction — the pile is pressed into a consolidated composite. The pressing takes place at room temperature between spaced-apart first and second pressing surfaces, at least a part of one of which is curved. The pressing surfaces are moved into a pressing position where all points on one of the pressing surfaces are equal distances from corresponding opposite points on the other second pressing surface, and maintained in this position for at least eighteen minutes. The veneer sheets thus pressed conform to the curved surfaces of the pressing surfaces and are consolidated into a composite that is resistent to cracking, splitting and checking when worked with conventional woodworking machinery.

4 Claims, 6 Drawing Figures

PATENTED APR 15 1975  3,878,015
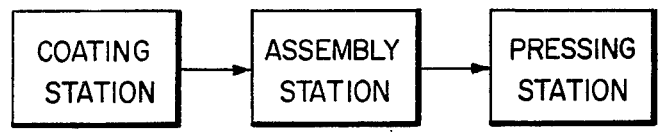
FIG. 1
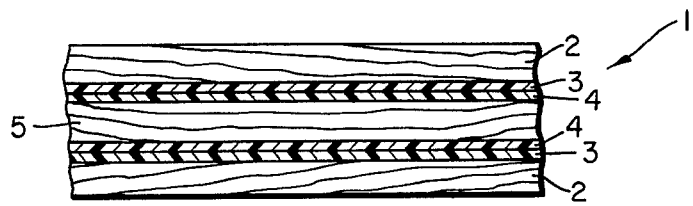
FIG. 2
FIG. 3
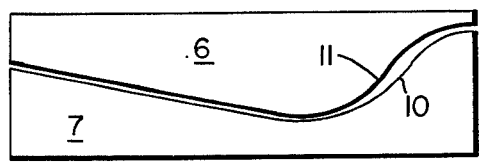
FIG. 4
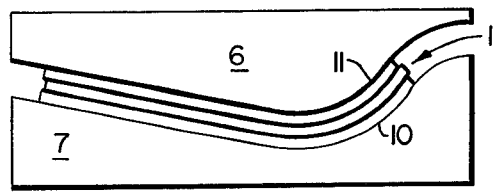
FIG. 6
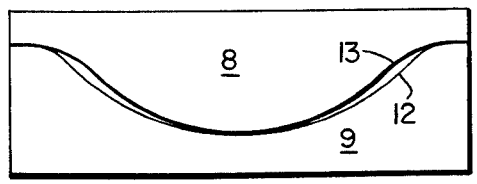
FIG. 5
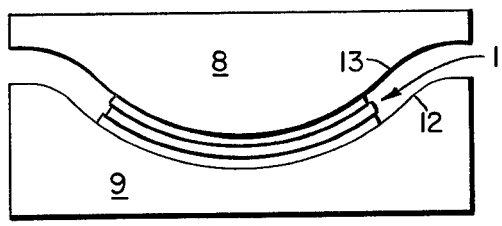

METHOD OF MOLDING CURVED VENEER LAMINATED STOCK

BACKGROUND OF THE INVENTION

It is well known that wood changes dimensions under changing moisture conditions in a direction transverse to the grain while still preserving dimensional stability parallel to the grain. Wood composites that are dimensionally stable in both directions is obviously desirable. Furthermore, to be able to work plywood, cutting, sawing, drilling and the like, without the veneer stock's splitting, tearing and otherwise exhibiting rough and ragged edges upon completion of the working, is also desirable. In addition, to make a curved piece of veneer laminate stock that exhibits the traits of dimensional stability as well as the absence of splitting, cracking and rough edges when worked with conventional woodworking machinery is something that the industry has long sought.

Industry has employed expensive equipment to achieve dimensional stability and easy workability in plywood by using, for example, electronic heating apparatus, and dielectric heating means. Not only is this expensive from the standpoint of capital investment, but such has proved, in some cases, not to solve the problems involved. Furthermore, inherent with such heating apparatus are thermosetting resins, thereby excluding the use of thermoplastic resins.

Numerous patents have issued dealing with improving the stability of various types of plywood panels, for example, U.S. Pat. No. 2,286,068. This patent discloses a dimensionally stable soft-wood plywood panel obtained by having the face and back piles of substantially the same thickness and parallel in grain direction to each other, in combination with random gluing of the face ply of the panel. In U.S. Pat. No. 2,363,987, there is described a soft plywood panel, which is dimensionally stable, made by initially laying up an unbalanced panel, that is, one where two face plies are of unequal thickness. The unbalanced panel is balanced by grooving the thicker ply to reduce it to an effective thickness equalling the thickness of the opposite face ply. U.S. Pat. No. 2,782,488 describes a method of making a balanced grooved plywood panel wherein substantially the same quantity of wood is removed from each of the face and back plies by grooving. A further teaching can be found in U.S. Pat. No. 2,565,251 where there is a disclosure of thermoset resin as well as hot or cold bluing processes under pressure. This latter teaching ("cold gluing") uses "cold set" thermosetting resins and accomplishes the desired result of eliminating surface checking.

All of the foregoing, as will be readily grasped, are complicated, expensive and require a great deal of expense. Furthermore, the prior art fails to teach that any curved pieces of laminated veneer stock can be made that will have the desired characteristics of stability and absence of checking, splitting and cracking upon being worked by ordinary woodworking machines.

Contrary to the prior art teachings, applicant has found that if a specified method of laminating is followed, all of the foregoing desired results can be obtained with the added advantage of producing curved laminated stock. Laminated curved stock has many uses, one of the major ones of which being in the furniture industry where curved components are necessary for chair backs and legs. Additionally, applicant has found that by following the teachings set forth herein, veneer sheet preparation such as grooves and the like, can be avoided and the entire operation can be carried out at room temperature. No expensive electronic heating equipment is needed; nor, is there any need for any heat at all, save for that of ordinary room temperature.

SUMMARY OF THE INVENTION

The invention as disclosed herein relates to a method of manufacturing a laminated veneer stock comprising certain specified steps. First, there is provided at least one innermost and two outermost wood veneer sheets, each having a grain and two major surface areas. A coating of polyvinyl acetate (PVA), either wholly or partially dissolved in a solvent, is applied on both sides of the innermost sheets and one of the major surface areas of both of the outermost sheets. Next, the coated sheets are assembled. It is important in this assemblying operation that there is a coating-to-coating relationship between all of the PVA coated major surfaces of the veneer sheets. Furthermore, it is also important that the grain direction of the sheets all extend in a common direction. After the veneer sheets are assembled into a pile in the aforementioned prescribed manner, the pile is pressed at room temperature into a consolidated composite.

It is not necessarily the amount of pressure that is applied, it is the manner in which the pressure is applied that is critical. Press platens are provided that have first and second spaced-apart pressing surface, at least a part of one of which is curved. The aforementioned pile is placed between these pressing surfaces and consolidation is then accomplished by moving the pressing surfaces to a pressing position where all points on said first pressing surface are equal distance from corresponding opposite points on the second pressing surface. Such a pressing position is held for at least eighteen minutes, to allow the solvent to evaporate, before retrieving the finished stock. If the foregoing steps are carried out, the assembled and coated veneer sheets are conformed to the configuration of the pressing surfaces and consolidated into a composite that exhibits characteristics obtainable only with much more expensive equipment (electronic heating) and thermosetting resins. The prior art has pointed out that grooving, veneer thicknesses, and/or use of resin impregnated sheets must be used to achieve a dimensionally stable consolidated veneer stock, resistant to splitting when worked with woodworking machines. Applicant has found that such teachings can be ignored, so long as the herein disclosed sequence of steps are carried out, and achieves the same if not better results in a piece of curved laminated veneer stock.

BRIEF DESCRIPTION OF THE DRAWINGS

FIG. 1 is a block diagram showing the three basic steps of the invention, i.e.: coating, assembling and pressing.

FIG. 2 is a front elevation of a laminated veneer stock, showing the coating-to-coating relationship between the innermost and outermost sheets and the grain of the individual veneer sheets lying in a common direction.

FIG. 3 is a side view of press platens in a closed position as used in the instant invention.

FIG. 4 shows the curved press platens of FIG. 3 in a pressing position with laminated veneer stock of FIG. 2 therebetween.

FIG. 6 is another example of curved press platens, as used in the disclosed method.

FIG. 5 shows the press platens of FIG. 6 in a pressing position with the laminated veneer stock of FIG. 2 therebetween.

DETAILED DESCRIPTION OF THE INVENTION

In FIG. 1 there is shown three basic stations, namely a coating, assembly and a pressing station. At the coating station, individual pieces of wood veneer are coated with polyvinyl acetate, either partially or entirely dissolved in a suitable solvent. For those pieces of wood veneer that are to form the outermost sheets of a particular consolidated composite, such as shown by element 2 in FIG. 2, the polyvinyl acetate is coated only on one surface. See element 3 in FIG. 2. Only two outermost sheets are necessary for any particular composite whereas any number of innermost sheets, element 5 of FIG. 2, can be utilized, depending on the thickness of the particular composite desired.

Once the PVA coating operation has taken place, the individual coated veneer sheets are assembled in the proper relationship as shown by FIG. 2, paying careful attention to two criteria. The first criteria to be observed is that for any PVA coated major surface of the veneer sheet, there is to be a coating-to-coating relationship. Note just such a relationship between veneer sheets 5 and 2. See PVA coatings 3 and 4. A second criteria to be observed is that all of the grains of the individual wood veneer sheets, namely elements 2 and 5 in FIG. 2, must be oriented in a common direction.

The pile that is assembled at the assembly station is then pressed at the pressing station. FIGS. 3, 4, 5 and 6 indicate examples of the manner in which the assembled pile is pressed. All pressing takes place at room temperature. It is not so much the amount of pressure that is applied to the assembled pile, but the manner in which pressure is applied. Curved sections of plywood are rather difficult to consolidate into a dimensionally stable piece of stock that will exhibit the characteristics of absence of checking and each machineability by woodworking machinery. Application of pressure of the manner in which applicant teaches achieves consolidation of the pile into a piece of veneer stock that exhibits the desired characteristics.

In FIGS. 3 and 4, press platens 6 and 7 are shown. Press platen 6 has pressing surface 11 and press platen 7 has pressing surface 10. At least one of pressing surfaces 10 and 11 is curved. It will be immediately noted that the curved surface 10 does not conform (is incompatible) to curved portion 11, when the press platens 6 and 7 are in their closed, otherwise contacting, position (FIG. 3). However, when press platens 6 and 7, as shown by FIG. 4, are in their pressing position, all points on surface 11 are equal distance from corresponding opposite points on surface 10. Furthermore, the ultimate composite achieved, as shown by element 1, is of a thickness so that when press platens 6 and 7 are in a desired pressing position, the thickness of the finished composite is such that all points on surface 11 are equal distance from corresponding opposite points on surface 10. Such a pressing position causes an equal distribution of pressure over the entire composite 1.

FIGS. 5 and 6 exhibit an example similar to that shown in FIGS. 3 and 4. Press platens 8 and 9 have curved pressing surfaces 13 and 12 respectively. As was the case in FIG. 3, the curved pressing surfaces 13 and 12, are not compatible (do not conform to one another) when such surfaces are in their closed position (FIG. 6). However, when the pressing surfaces 12 and 13 (press platens 8 and 9 respectively) are in their ultimate pressing position, FIG. 5, all points on pressing surface 13 are equal distance from corresponding opposite points on pressing surface 12. Furthermore, curved consolidated composite 1 has a thickness that is predetermined so that surface 12 is spaced apart from surface 13 a distance equal to that distance necessary to space apart press platen 8 where all points on pressing surface 13 are equal distances from corresponding opposite points on pressing surface 12. A minimum of eighteen minutes should be allowed in such a pressing position to permit the solvent of the PVA to evaporate.

By following the method steps set forth above, a curved consolidated composite is achieved. This composite retains its curvature, demonstrates dimensional stability, and can be machined by conventional woodworking machinery without splitting or cracking occurring. Applicant has found that if the pressing takes place with the press platens 6 and 7 or 8 and 9 spaced apart a distance other than that which has been set forth above, a consolidated composite is achieved that does not conform to industry standards of strength and durability and does not have the dimensional stability and the necessary resistance to splitting and cracking that is otherwise found in composites made by the foregoing method.

Thus, it can be readily appreciated that it is not necessarily the amount of pressure that is applied, but it is the manner in which it is applied. Obviously, the manner in which the pressure is applied, according to the instant invention, is inherently controlled so that the polyvinyl acetate 3 and 4 is not squeezed out between the veneer sheets 2 and 5. Supervisory personnel need only to instruct a press platen operator that press platens 6, 7, 8 and 9 need only be spaced apart a particular thickness, namely that distance shown in FIGS. 4 and 5 for the desired eighteen minutes. For some reason, this distance (stock thickness) appears to be more readily understood by operators than the concept of a particular pressure. This is especially true when press platen operators are required to switch from one thickness to another and then back to the same thickness during a working day. Therefore, the herein disclosed method readily lends itself to making curved laminated wood veneer consolidated composites of varying thicknesses and surface curvatures with a minimum amount of instructions.

What is claimed is:

1. A method of manufacturing a laminated wood veneer stock comprising:
   a. providing at least one innermost and two outermost wood veneer sheets each having a grain and two major surface areas;
   b. coating said innermost sheet or sheets on both of said major surfaces thereof and one of the major surfaces of both of said outermost sheets with polyvinyl acetate;
   c. assembling said coated veneer sheets into a pile so that said sheets have a polyvinyl acetate coating-tocoating relationship between all of said major surfaces, save for one surface of each said outermost veneer sheets, and the grain of such sheets extending in a common direction; and, d. at room temperature, consolidating said pile into a composite of predetermined thickness by pressing same into final shape, for at least eighteen minutes, between first and second spaced-apart curved pressing surfaces which are non-conforming in closed contacting positions and which are so configured that all points on said first pressing surface are equidistant from corresponding opposite points on said second pressing surface when the spacing between said pressing surfaces is equal to said predetermined thickness of said composite, thereby conforming said veneer sheets to the configuration of said pressing surfaces.

2. A method of manufacturing a laminated wood veneer stock comprising:

a. providing at least one innermost and two outermost wood veneer sheets each having a grain and two major surface areas;

b. coating said innermost sheet or sheets on both of said major surfaces thereof and one of the major surfaces of both of said outermost sheets with polyvinyl acetate;

c. assembling said coating veneer sheets into a pile so that said sheets have a polyvinyl acetate coating-to-coating relationship between all of said major surfaces, save for one surface of each said outermost veneer sheets, and the grain of such sheets extending in a common direction; and d. at room temperature, consolidating said pile into a composite of predetermined thickness by pressing same into final shape between first and second spaced-apart curved pressing surfaces which are non-conforming in closed, contacting positions and which are so configured that all points on said first pressing surface are equidistant from corresponding opposite points on said second pressing surface when the spacing between said pressing surfaces is equal to said predetermined thickness of said composite, thereby conforming said veneer sheets to the configuration of said pressing surfaces.

3. A method of manufacturing a laminated wood veneer stock comprising:

a. providing at least one innermost and two outermost wood veneer sheets each having a grain and two major surface areas;

b. coating said innermost sheet or sheets on both of said major surfaces thereon and one of the major surfaces of both of said outermost sheets with an adhesive consisting essentially of polyvinyl acetate;

c. assembling said coated veneer sheets into a pile, so that said sheets have a polyvinyl acetate coating-to-coating relationship between all of said major surfaces, save for one surface of each of said outermost veneer sheets and the grain of such sheets extending in a common direction; and, d. at room temperature, consolidating said pile into a composite of predetermined thickness by pressing same into final shape between first and second spaced-apart curved pressing surfaces which are non-conforming and non-complimentary in closed contacting positions and which are so configured that all points on said first pressing surface are equidistant from corresponding opposite points on said second pressing surface when the spacing between said pressing surfaces is equal to said predetermined thickness of said composite, thereby conforming said veneer sheets to the configuration of said pressing surfaces.

4. A method as set forth in claim 3 wherein that pressing position where all points on said first pressing surfaces are equidistant from corresponding opposite points on said second pressing surface is maintained for at least eighteen minutes.

* * * * *